United States Patent

[11] 3,614,034

| [72] | Inventor | Richard E. Townsend |
| | | Huntington, Long Island, N.Y. |
| [21] | Appl. No. | 840,202 |
| [22] | Filed | July 9, 1969 |
| [45] | Patented | Oct. 19, 1971 |
| [73] | Assignee | Fairchild Hiller Corporation |
| | | Farmingdale, L. I., N.Y. |

[54] V/STOL AIRCRAFT
8 Claims, 7 Drawing Figs.

[52] U.S. Cl. ........................................... 244/56,
244/12 A
[51] Int. Cl. ........................................... B64d 27/20
[50] Field of Search ........................................... 244/53–56,
12, 23

[56] References Cited
UNITED STATES PATENTS

| 3,289,980 | 12/1966 | Hill | 244/56 |
| 3,363,860 | 1/1968 | Maguire | 244/54 |
| 3,445,079 | 5/1969 | Burns | 244/54 |
| 3,451,648 | 6/1969 | Pabst et al. | 244/56 |
| 3,454,241 | 7/1969 | Riemerschmid | 244/55 |
| 3,460,783 | 8/1969 | Haberkorn | 244/56 |
| 3,507,465 | 4/1970 | Weigmann | 244/56 |

*Primary Examiner*—Milton Buchler
*Assistant Examiner*—Steven W. Weinrieb
*Attorney*—Darby & Darby ABSTRACT: A V/STOL aircraft includes retractable lifting jet engines adapted to be stored in the fuselage and extendable to opposite sides of the aircraft with their respective thrust axes being adjustable between horizontal and vertical positions. Each of the lifting jet engines is mounted on a pivotable arm with an extendable tilt rod secured to the mounting structure to pivot the lifting jet engines from a horizontal stowage position to an operating position where they can be adjusted for vertical thrust. The arms and tilt rods are mounted on a movable carriage so that the engines may be translated horizontally in a direction transverse to the fuselage axis to provide roll control. By pivoting the engines on the mounting arms, variable-pitch control may be provided. The lifting jet engines are also mounted for rotation relative to their associated arms about axes generally parallel to the fuselage axis, with means for simultaneously rotating the lifting jet engines about these axes to provide yaw control.

PATENTED OCT 19 1971

INVENTOR
RICHARD E. TOWNSEND

BY Darby & Darby

ATTORNEYS

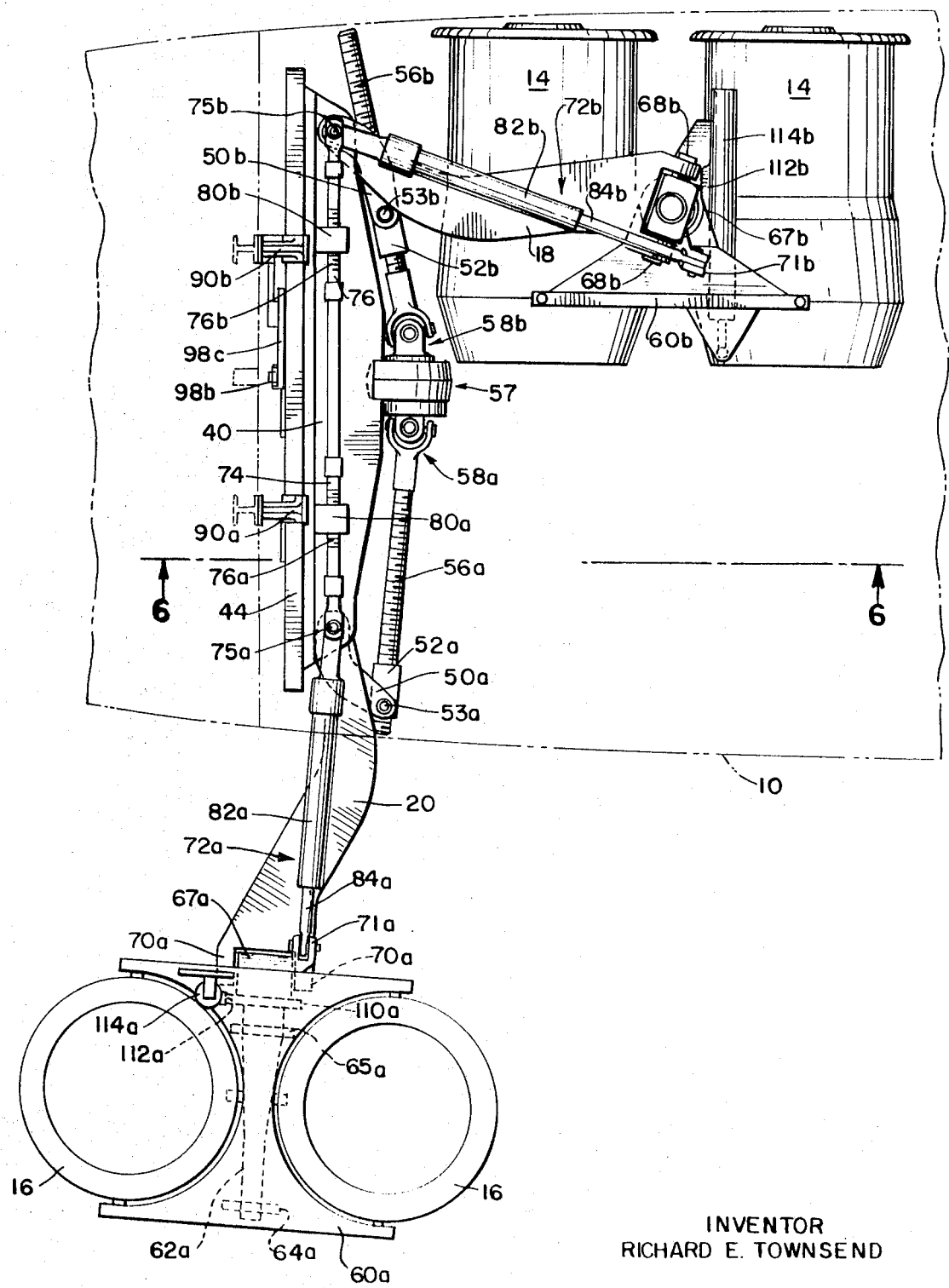

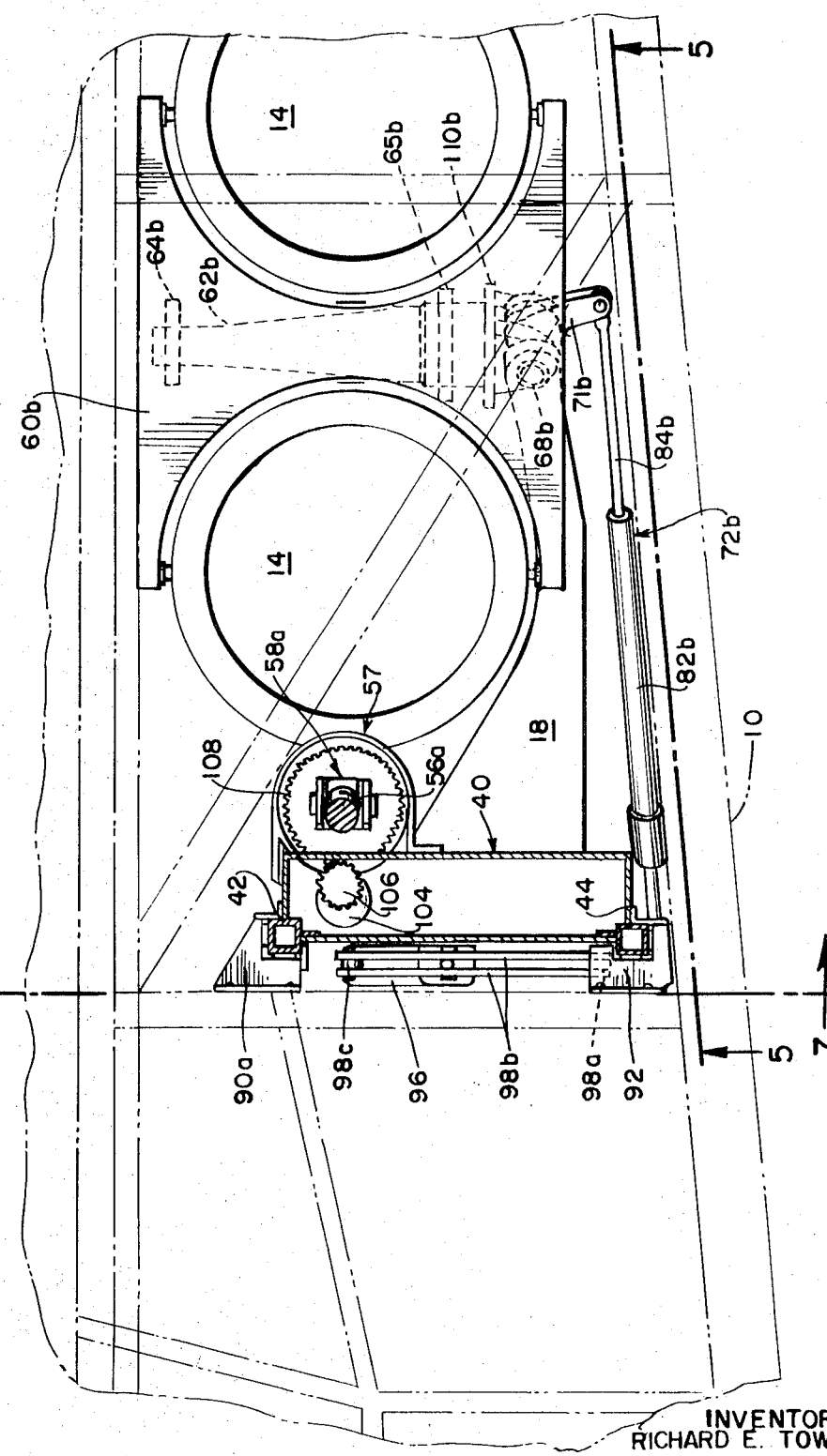

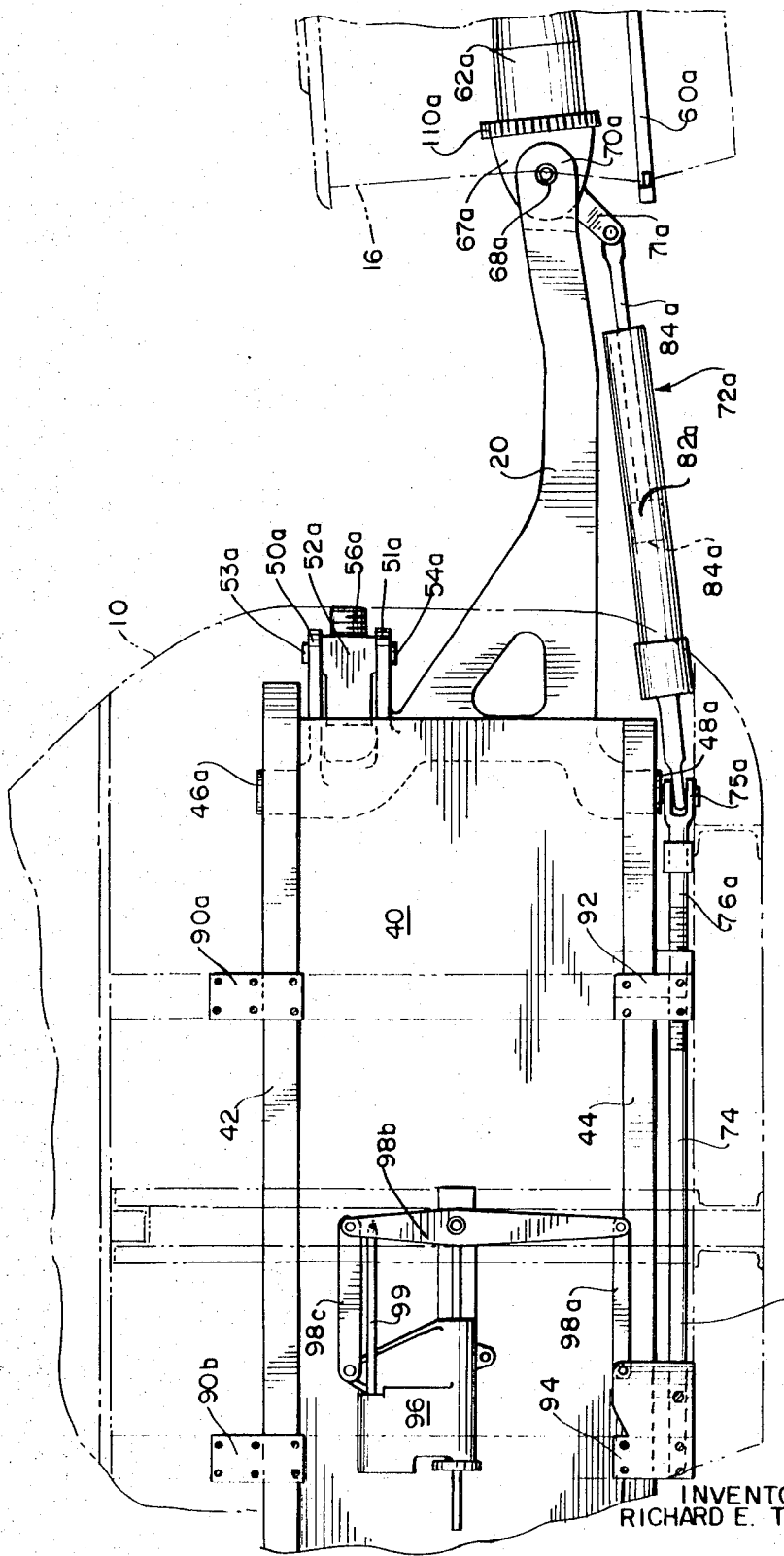

V/STOL AIRCRAFT

This invention relates to V/STOL aircraft of the type wherein lifting jet engines, which are normally stowed in the aircraft fuselage, can be extended into operable positions for takeoff and landing or, possibly, to provide auxiliary horizontal thrust.

V/STOL aircraft of the type mentioned above have been described in U.S. Pat. No. 3,363,860 of Maguire, 3,302,907 of Wilde et al. and 3,445,079 of Burns. Each of these patents shows various constructions whereby special lifting jet engines can be extended from the fuselage to provide substantial vertical thrust for takeoff and landing purposes.

In addition to the constructions illustrated in these patents, it has been proposed to provide a mounting configuration for retractable lifting engines wherein the lifting jets are automatically pivoted, during extension, from a horizontal stowage position to a vertical operating position. Such constructions include mounting arms for the lifting jets and rigid tilt rods. The lengths of the tilt rods are such that the lifting jets are caused to pivot relative to their associated arms while the arms are being rotated to their fully extended positions. With this type of construction, it is possible to achieve a moderate degree of auxiliary stabilizing control (i.e. pitch, yaw, and roll) of the aircraft either by using the lifting jets alone or in proper combination with the main engines which provide the thrust for the usual flight conditions.

The present invention is a further improvement over these known configurations in that it enables greater flexibility in selectively deploying the lifting jets and thus provides improved control of aircraft stabilization. Such control may be provided by the lifting jets alone or in combination with the main cruise engines. In either case, the additional control of stability provided renders this type of basic design (i.e. retractable lifting jets) more practical as an approach to the design of commercially feasible V/STOL aircraft.

The preferred embodiment of the invention has a further advantage in that equal and opposite stresses are created in the support members during movement of the lifting jets to thereby reduce the structural requirements of the fuselage frame which otherwise would have to bear a greater proportion of the stresses produced by positioning and operation of the lifting jets.

Briefly, in accordance with the invention, the lifting jets and the extension apparatus are mounted on a carriage which is movable from side to side to position the extended lifting jets laterally for the purpose of roll control. According to a further feature of the invention, extendable tilt rods are provided for rotating the lifting jets into operating positions, with the mounting arms being mounted so that they may be moved selectively to fore and aft positions for the purpose of pitch control and without affecting the positions of the lifting jets thrust axes. Additionally, means are provided to pivot the extended lifting jets about respective first axes generally parallel to the fuselage axis for the purpose of yaw control.

The invention is described in further detail below with reference to the attached drawings, wherein:

FIG. 5 is a bottom plan view of the lifting jet extension apparatus according to a preferred embodiment of the invention;

FIG. 6 is a side sectional view along the line 6—6 of FIG. 5; and

FIG. 7 is a front view along the line 7—7 of FIG. 6.

Figure 1:
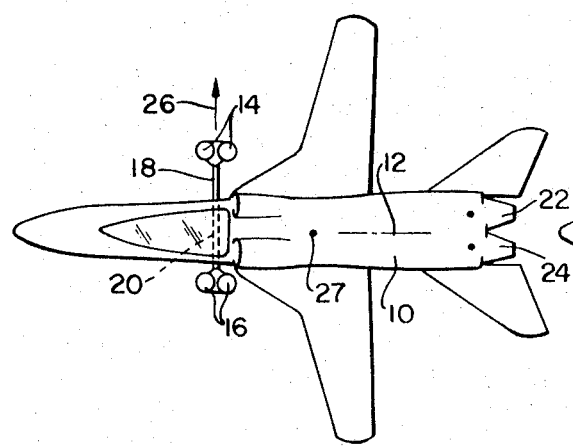
FIG. 1 is a diagrammatic view showing how the position of the lifting jets can be used to control aircraft roll.

In describing and claiming the invention, it is necessary to maintain planes and axes of reference so that the respective parts of the aircraft can be clearly and concisely defined. Accordingly, in the following description and claims, the terms "horizontal" and "vertical" are used with reference to an aircraft which is at rest (or flying horizontally). The longitudinal fuselage axis is thus considered to be in a horizontal plane and the thrust axes of the lifting jets are considered to be vertical when the lifting jets are extended to their takeoff and landing positions. It is not intended, however, that these terms "horizontal" and "vertical" be limiting in any respect other than to define relative direction, planes, axes, or directions. Furthermore, those skilled in the art will recognize that even where the terms "vertical" and "horizontal" are used in this general sense, from a practical viewpoint the relationship of parts so described will, in most cases, not be precisely transverse or parallel, as the case may be.

Referring now to FIGS. 1-4, a general description of the structure and functions of the preferred embodiment of the invention is presented to facilitate the subsequent detailed description thereof. The aircraft fuselage is indicated at 10 with the longitudinal fuselage axis being shown at 12. A first pair of lifting jet engines 14 and a second opposite pair of lifting jet engines 16 are shown mounted on respective arms 18 and 20 which pivot about axes transverse to fuselage axis 12 to extend the engines 14 and 16 to their fully extended positions illustrated in FIG. 1. Essentially, the lifting jets 14 and 16 are auxiliary power plants intended to enable vertical or short takeoff and landing. Suitable lifting jet engines for this purpose are described in the above-mentioned patents and/or publications referred to therein. In addition to lifting jets 14 and 16, main cruise engines 22 and 24 provide the horizontal thrust required during usual flight conditions.

As shown in FIG. 1, by moving the lifting jet engines 14 and 16 (and the mounting arms 18 and 20) horizontally in a direction transverse to axis 12 (as shown by arrow 26) the respective moments provided by the opposed lifting jets relative to the fuselage axis 12 can be adjusted. This lateral translation of the lifting jet engines can be used to compensate for aircraft roll during flight.

Figure 2:
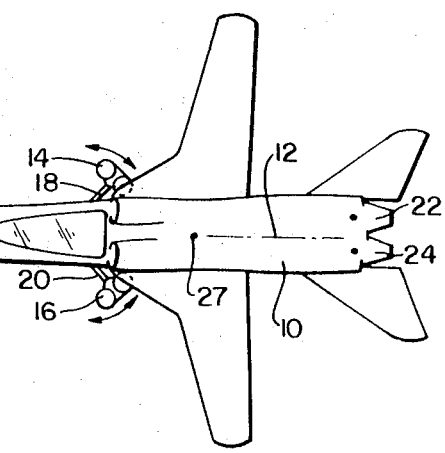
FIG. 2 is a diagrammatic view showing positioning of the lifting jets to provide pitch control.

Pitch control can be provided by moving the lifting jet engines fore and aft to change the length of the moment arm about the center of the aircraft. This may be provided, as shown in FIG. 2, by rotating the arms 18 and 20 beyond their fully extended position illustrated in FIG. 1 (in either direction). The resultant longitudinal translation of the lifting jets relative to the center of gravity of the aircraft (shown at 27) can be used to counteract any tendency of the aircraft to pitch.

Figure 3:
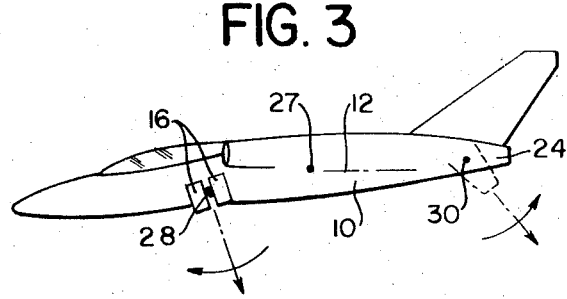
FIG. 3 is a diagrammatic view showing positioning of the lifting jets in combination with the lift/cruise engines to provide a further type of pitch control.

FIG. 3 illustrates a manner in which the lifting jets 16 (and 14) may be rotated about a horizontal axis 28 to provide, in combination with the rotation of the deflection nozzles of the main engines 22 and 24 about a parallel axis 30, a differential thrust effect which may also be used to control pitch. Although, as explained below, the preferred embodiment of the invention provides for this type of control of the lifting jets, the principles of differential vectoring do not, broadly speaking, comprise a part of this invention.

Figure 4:
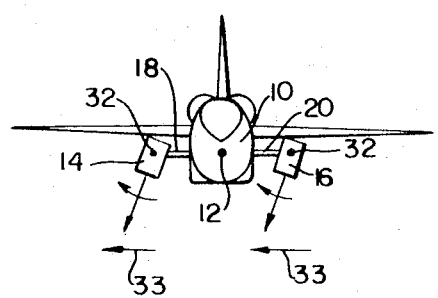
FIG. 4 is a diagrammatic view showing positioning of the lifting jets to effect yaw control.

In FIG. 4, the lifting jets 14 and 16 are shown as having been pivoted around respective axes 32 which are generally parallel to the fuselage axis 12. By pivoting the lifting jets 14 and 16 about this axis 32, a component of thrust in a horizontal direction is produced. This component is represented by vectors 33. Since this thrust component acts on the forward portion of the aircraft to produce a moment about a vertical axis through the center of gravity of the aircraft, it can be used to counteract any yaw of the aircraft. The degree of rotation of the lifting jets about axes 32 determines the amount of horizontal thrust provided (relative to the total thrust) and thus the extent of the yaw control.

FIGS. 5-7 illustrate the specific construction of a preferred embodiment of the invention, capable of providing the stabilizing control described above with reference to FIGS. 1-4. To the extent possible, the numerals of FIGS. 1-4 are used in describing FIGS. 5-7.

In FIG. 5 the lifting jet engines 14 are shown in their stowed position within the fuselage while the jets 16 are shown in their fully extended position. Of course, in practice, the jets 14 and 16 will always be in the same position, the configuration of FIG. 5 being used merely for explanatory purposes to illustrate both the extended and stowed positions. Furthermore, inasmuch as both sides of the mechanism are identical, only those parts which are directly associated with the lifting jets 16 and arm 20 are described below, which such parts being indicated by the lower case letter "a." The corresponding part associated with lifting jets 14 and arm 18 is indicated by the same numeral and the lower case letter "b."

The arms 18 and 20 are mounted in opposite sides of a vertical carriage 40. The carriage includes an upper wall 42 (FIG. 7) and a lower horizontal wall 44 in which oppositely extending axle portions 46a and 48a of arm 20 are suitably journaled. An upper lug 50a and a lower horizontal lug 51a in the vicinity of axle portion 46a extend outwardly from the arm 20 and pivotally retain a ball bearing screwjack 52a by pins 53a and 54a. The ball bearing jack 52a is threadedly received on a screw 56a which can be rotated by a motor unit 57 (FIG. 5) through a universal joint 58a.

The lifting jet engines 16 are secured within a suitably shaped cradle 60a which is rotatably mounted on a tapered axle 62a by means of bearings 64a and 65a (FIG. 5). The larger end of the tapered axle 62a terminates in a rounded lug 67a (FIG. 7) including oppositely extending pins 68a which are received between a pair of truncated extensions 70a of arm 20. The entire axle 62a can pivot with respect arm 20 about the pins 68a. Since rotation of the lifting jets 16 about this axis provides the yaw control illustrated in FIG. 4, this particular axis which is generally parallel to the fuselage axis during operation is referred to hereinafter as the yaw axis.

An ear 71a extends downwardly from the axle lug 67a where it is pinned to one end of an extendable tilt rod 72a, the other end of which is received in the right-hand end of a threaded yaw actuator 74 (FIGS. 5 and 7). The threaded portions 76a and 76b of the actuator 74 engage suitable actuator means (not shown) within respective motors 80a and 80b so that the yaw actuator may be laterally driven between left and right hand extremes. The tilt rod 72a includes an hydraulic cylinder 82a which can position a piston 84a so that the length of the tilt rod between the tapered axle mounting ear 71a and the right-hand end of the yaw actuator 74 can be changed.

Where the length of the tilt rod 72a is suitably selected relative to the length of the mounting arm 20, it will cause the lifting jets 16 to rotate, or tilt, on pins 68a as the arm moves between the stowed position illustrated at the top of FIG. 5 and an extended position in which the lifting jets are vertically stacked with their thrust axes horizontal (not shown). Thus, recalling that FIG. 5 is a bottom view, as the arm 20 is rotated counterclockwise into the fuselage, the piston 84a is extended while the entire tilt rod 72a pivots about pin 75a (which is colinear with the axles 46a and 48a of arm 20) causing the axle 62a (which supports the lifting jets 16) to rotate down into the plane of the paper, i.e., with reference to FIG. 7, the axle 62a rotates counterclockwise about the yaw axis of pin 68a.

The movable carriage 40 is slidably retained in top brackets 90a and 90b (FIG. 7) and bottom brackets 92 and 94, which are suitably secured (e.g. by riveting) to the fuselage frame. The upper and lower walls 42 and 44, respectively, of the carriage 40 may be provided with suitable bearing surfaces to permit smooth sliding. An hydraulic actuator 96 is mounted on the carriage 40 and adapted to position itself (and carriage 40) relative to the aircraft frame by means of a standard multilever linkage 98a, 98b and 98c. One end of lever 98a is pivotally secured to bracket 94, with its other end and an end of lever 98c being pivotally connected to respective ends of lever 98b. The other end of lever 98c is pivotally connected to the casing of actuator 96 so that upon application of fluid pressure to actuator 96 the carriage 40 may be moved to the left or the right within the brackets 90a, 90b, 92 and 94. This provides the lateral translation of the lift engines for roll control purposes as diagrammatically shown in FIG. 1. A feedback link 99 may be used to provide a central signal in a known fashion for the electrical control means which operates generator 96.

The rotary drive 57 is shown in detail in FIG. 6. It includes a motor 104 which, through a pinion 106, drives a gear 108 secured to both of the universals 58a and 58b. Hence, as the gear 108 turns, the screws 56a and 56b are rotated to move the ball bearing jacks 52a and 52b, thus causing the mounting arms 18 and 20 to rotate about their respective mounting axles 46 and 48.

It is also necessary to rotate the extended lifting jets 14 and 16 about the axes 28 (FIG. 3) for stowage purposes and to provide a variable vertical thrust. For this purpose, the lug 66a includes a gear 110a in engagement with a rack 112a (FIG. 5) which may be positioned by an hydraulic actuator 114a to cause the entire cradle 60a to rotate about the axle 62a. To stow the lifting jets, they are first rotated by this mechanism so that their thrust axes are horizontal and then the arms 18 and 20 are pivoted into the fuselage as the tilt arms are extended.

If it is desired to provide the pitch control of the type shown in FIG. 2, the motor 57 is actuated to position the mounting arms 18 and 20 at a desired location, either fore or aft of the fully extended engine position. Since the arms 20 and 18 pivot about axes which are colinear with the pivot axes of the tilt rods 72a and 72b, respectively, no change in the length of the tilt rods is necessary to maintain the thrust axes of the jets vertical during this pitch control operation.

The yaw control shown in FIG. 4 is provided by operation of the motors 80a and 80b (FIG. 5) which causes a lateral translation of the yaw actuator 74. Actuator 74 pushes one of the tilt rods 72a, 72b and pulls the other, causing the motors 14 and 16 to rotate in the same direction about the two yaw axes 32 represented by pins 68.

The different controls may be programmed to take effect in many different ways. Preferably, during extension, the length of the tilt rods will not be decreased until the engines have been deployed from their retracted positions and are clear of the fuselage. The tilt rods 72a and 72b may then be locked in their positions by conventional means (not shown) prior to starting the engines. Thereafter, when the engines are positioned for yaw control (FIG. 4), it is possible to combine pitch and roll control (FIGS. 2 and 1) without interference.

It is apparent that the present disclosure of a preferred embodiment has been simplified in many respects. Since the control actuators and other means for providing the required power to move the illustrated parts can be standard items, these items for the most part have been illustrated only in diagrammatic terms. Similarly, no effort has been made to illustrate the various fluid lines which would be required for hydraulic actuation inasmuch as such features are deemed to be matters of obvious technical skill. It is expected that the invention will provide advantages from the viewpoints of safety and manufacture as well as performance. Thus, the fact that the entire operating mechanism may be mounted on a movable platform or carriage lends itself to modular construction wherein the individual parts can be fully assembled and tested outside of the aircraft. The ability to move the lifting jets fore and aft provides a safety advantage by increasing the available balanced aircraft lift in the event of a failure of the cruise (or lifting jet) engines. The ability to control stability by the mere deployment of engines will result in improved efficiency and thus more economical operation.

What is claimed is:

1. In an aircraft having at least two oppositely disposed retractable lifting jet engines movable between a stowed position within the aircraft fuselage in which their thrust axes are horizontal and an operable position outside the aircraft, wherein each of said lifting jet engines is mounted on a pivotable arm with means for rotating each of said lifting jet engines relative to its associated arm so that said thrust axes may be adjusted between horizontal and vertical positions, the improvement comprising, a single carriage for supporting said oppositely disposed lifting jet engines located within the fuselage and laterally moveable relative to said fuselage said arms being pivotally secured to opposite sides of said single carriage at their ends away from said lifting jet engines, and means for moving said single carriage laterally from side to side in a direction generally transverse to the longitudinal axis of the aircraft.

2. An aircraft according to claim 1, further including a mounting member associated with each arm for supporting the lifting jet engines associated with its arm, and means mounting each of said mounting members for rotation in either direction relative to its associated arm about respective yaw axes external of the aircraft and generally parallel to the longitudinal axis of said aircraft when said engines are in their operable positions.

3. An aircraft according to claim 2, wherein said mounting means includes two tilt rods, one end of each being connected to a respective one of said mounting members at a point displaced from said yaw axes, and means for simultaneously urging the other ends of said tilt rods in the same general direction to rotate said lifting jet engines about said yaw axes.

4. In an aircraft having at least two oppositely disposed retractable lifting jet engines movable between a stowed position within the aircraft fuselage in which their thrust axes are horizontal and an operable position outside the aircraft, wherein each of said lifting jet engines is mounted on a pivotable arm with means for rotating each of said lifting jet engines relative to its associated arm so that said thrust axes may be adjusted between horizontal and vertical positions, the improvement comprising, a mounting member associated with each arm for supporting the lifting jet engines associated with its arm, means mounting each of said mounting means for rotation in either direction relative to its associated arm about respective yaw axes external of the aircraft and generally parallel to the longitudinal axis of said aircraft when said engines are in their operable positions, two tilt rods, one end of each being secured to a respective one of said lifting jet engines, the other ends being pivotally secured in said fuselage, and means for varying the lengths of said tilt rods relative to said arms to cause said lifting jet engines to rotate about their respective yaw axes.

5. An aircraft according to claim 4, wherein the axes of rotation of each of said tilt rods and its associated arm are substantially colinear.

6. An aircraft having at least two oppositely disposed retractable lifting jet engines movable between a stowed position within the aircraft fuselage in which their thrust axes are horizontal and an operable position outside the fuselage, wherein each of said lifting jet engines is mounted on a pivotable arm, comprising, a mounting member associated with each arm for supporting the lifting jet engines associated with its arms, means for rotating each of said mounting members relative to its associated arm about an axis approximately parallel to the axis of such arm so that said thrust axes may be adjusted between horizontal and vertical positions, and means mounting each of said mounting members for rotation in either direction relative to its associated arm about a yaw axis external of the aircraft and generally parallel to the longitudinal axis of said aircraft when said engines are in their operable positions.

7. An aircraft according to claim 6, wherein said mounting means includes two rods, one end of each being secured to a respective one of said lifting jet engines, and means for simultaneously urging the other ends of said rods in the same general direction to rotate said lifting jet engines about said yaw axis.

8. An aircraft according to claim 6, wherein each of said means for rotating includes an axle transverse to its associated arm when the arm is in its operable position, each said mounting member being rotatably supported on said axle for rotation about a roll axis, and wherein said means mounting each of said mounting members comprises means pivotably supporting said axles on their associated arms for rotation relative to said arms about said yaw axes.